(12) United States Patent
Khafagy et al.

(10) Patent No.: US 10,421,456 B2
(45) Date of Patent: Sep. 24, 2019

(54) CUSTOMIZED ELECTRIC PARKING BRAKE RESPONSE TO MAINTAIN ENGINE AUTO-STOP WITH BRAKE RELEASED

(71) Applicant: FORD GLOBAL TECHNOLOGIES, LLC, Dearborn, MI (US)

(72) Inventors: Hafiz Shafeek Khafagy, Dearborn, MI (US); Ebrahim Nasser, Dearborn, MI (US); Mohannad Hakeem, Dearborn, MI (US); Nayaz Khalid Ahmed, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 181 days.

(21) Appl. No.: 15/437,088

(22) Filed: Feb. 20, 2017

(65) Prior Publication Data
US 2018/0237016 A1 Aug. 23, 2018

(51) Int. Cl.
*B60W 30/18* (2012.01)
*B60T 7/04* (2006.01)
(Continued)

(52) U.S. Cl.
CPC ....... *B60W 30/18009* (2013.01); *B60T 7/042* (2013.01); *B60T 7/12* (2013.01); *B60T 8/17* (2013.01); *B60T 8/245* (2013.01); *B60T 8/32* (2013.01); *B60W 10/06* (2013.01); *B60W 10/182* (2013.01); *B61H 1/00* (2013.01); *B60T 2201/06* (2013.01); *B60T 2201/10* (2013.01); *B60W 2510/1005* (2013.01); *B60W 2520/10* (2013.01); *B60W 2540/10* (2013.01);
(Continued)

(58) Field of Classification Search
CPC ..... B60W 30/18009; B60W 2710/188; B60W 2710/06; B60W 2550/142; B60W 2540/12; B60W 2540/10; B60W 2520/10; B60W 2510/1005; B60W 10/182; B60W 10/06; F02N 11/0818; B60T 2201/10; B60T 8/32; B60T 8/245; B60T 8/17; B60T 7/12; B60T 7/042; B61H 1/00
See application file for complete search history.

(56) References Cited

U.S. PATENT DOCUMENTS 7,890,243 B2 2/2011 Abendroth
8,280,608 B2 10/2012 Senda et al.
(Continued)

FOREIGN PATENT DOCUMENTS

CN 2027831709 3/2013
WO 13110676 A2 9/2013

*Primary Examiner* — Jerrah Edwards
*Assistant Examiner* — Mathew Franklin Gordon
(74) *Attorney, Agent, or Firm* — David Kelley; Brooks Kushman P.C.

(57) ABSTRACT

A vehicle control method includes, by a controller, while an engine is auto-stopped and an electric parking brake is engaged, auto-starting the engine without releasing the electric parking brake responsive to application of an accelerator pedal less than a predefined amount, and auto-starting the engine and releasing the electric parking brake responsive to application of the accelerator pedal greater than the predefined amount. The method also includes comprising auto-stopping the engine and engaging the electric parking brake responsive to vehicle speed being less than a predefined threshold speed.

16 Claims, 6 Drawing Sheets

(51) Int. Cl.

| | |
|---|---|
| *B60T 7/12* | (2006.01) |
| *B60T 8/24* | (2006.01) |
| *B60T 8/32* | (2006.01) |
| *B60W 10/06* | (2006.01) |
| *B60W 10/18* | (2012.01) |
| *B61H 1/00* | (2006.01) |
| *B60T 8/17* | (2006.01) |
| *F02N 11/08* | (2006.01) |

(52) U.S. Cl.
CPC ... *B60W 2540/12* (2013.01); *B60W 2550/142* (2013.01); *B60W 2710/06* (2013.01); *B60W 2710/188* (2013.01); *F02N 11/0818* (2013.01)

(56) References Cited

U.S. PATENT DOCUMENTS

| | | |
|---|---|---|
| 9,062,618 B2 | 6/2015 | Rademacher et al. |
| 9,327,710 B2 | 5/2016 | Malone et al. |
| 2006/0049691 A1* | 3/2006 | Deprez .................... B60T 7/00 303/191 |
| 2007/0267238 A1 | 11/2007 | Guy et al. |
| 2014/0088853 A1* | 3/2014 | Christen ............. F02N 11/0822 701/112 |
| 2015/0057859 A1* | 2/2015 | Yamamoto ................ B60T 7/12 701/22 |
| 2016/0023660 A1 | 1/2016 | Yu |
| 2016/0032995 A1 | 2/2016 | Nishino et al. |
| 2016/0304096 A1* | 10/2016 | Khafagy ......... B60W 30/18109 |
| 2017/0043767 A1* | 2/2017 | Khafagy ............... B60W 10/06 |
| 2017/0203762 A1* | 7/2017 | Khafagy ............... B60K 37/02 |
| 2017/0217438 A1* | 8/2017 | Iwamoto .............. B60W 10/02 |

\* cited by examiner

CUSTOMIZED ELECTRIC PARKING BRAKE RESPONSE TO MAINTAIN ENGINE AUTO-STOP WITH BRAKE RELEASED

TECHNICAL FIELD

The present disclosure relates to actuating electric parking brake (EPB) responses in various engine auto-stop and brake conditions, and more particularly, utilizing a customized EPB response based on dealer or customer settings for various engine auto-stop and brake conditions.

BACKGROUND

An auto-stop/start vehicle may utilize a strategy for starting and stopping the vehicle engine during a drive cycle. For example, the engine auto-stops when the vehicle stops at traffic signals, cross-walks, stop signs, and the like. When power is requested, as typically signaled by a brake pedal release, the engine is automatically restarted. The engine auto-stop/start feature improves the vehicle's fuel economy.

Vehicles also utilize a parking brake which is configured to, upon application, apply a braking force to prevent vehicle motion, such as rolling. The parking brake may be an electronic or electric parking brake (EPB). Customer requirements and preferences for applying the EPB vary based on habit, such as applying the EPB when the vehicle reaches a full stop while the gear is in drive so that the driver can release the brake pedal upon applying the EPB. Customers utilizing the EPB in this manner do not benefit from the auto-stop/start strategies, as the engine auto-starts on brake pedal release.

SUMMARY

According to an embodiment, a vehicle control method includes, by a controller, while an engine is auto-stopped and an electric parking brake is engaged, auto-starting the engine without releasing the electric parking brake responsive to application of an accelerator pedal less than a predefined amount, and auto-starting the engine and releasing the electric parking brake responsive to application of the accelerator pedal greater than the predefined amount.

In one or more embodiments, the method may include auto-stopping the engine and engaging the electric parking brake responsive to vehicle speed being less than a predefined threshold speed. The method may also include, by the controller, regardless of whether the engine is auto-stopped and whether the electric parking brake is engaged, engaging, or keeping engaged, the electric parking brake responsive to shifting the engine to park, neutral, or reverse. Engaging or keeping engaged the electric parking brake responsive to shifting the engine to reverse may further include engaging the electric parking brake responsive to whether a brake pedal is depressed. The method may include, by the controller, while the engine is auto-stopped and the electric parking brake is not engaged, selectively engaging the electric parking brake responsive to a manual input while a brake pedal is applied. The method may also include, by the controller, while the engine is auto-stopped and the electric parking brake is not engaged, auto-starting the engine responsive to the brake pedal not being applied.

According to an embodiment, a vehicle control method includes, by a controller, while a vehicle is on a road grade greater than a predefined degree, automatically applying an electric parking brake responsive to auto-stopping an engine regardless of whether a brake pedal is pressed, and while the vehicle is on a road grade less than the predefined degree, selectively applying the electric parking brake responsive to auto-stopping the engine based on whether the brake pedal is pressed.

In one or more embodiments, the method may further include auto-stopping the engine responsive to vehicle speed being less than a predefined threshold speed. The method may also include, by the controller, while the engine is auto-stopped and the electric parking brake is engaged, auto-starting the engine without releasing the electric parking brake responsive to application of an accelerator pedal less than a predefined amount, and auto-starting the engine and releasing the electric parking brake responsive to application of the accelerator pedal greater than the predefined amount. The method may include, by the controller, regardless of whether the engine is auto-stopped and whether the electric parking brake is engaged, engaging, or keeping engaged, the electric parking brake responsive to shifting the engine to park, neutral, or reverse. Engaging or keeping engaged the electric parking brake responsive to shifting the engine to reverse may further include engaging the electric parking brake responsive to whether the brake pedal is depressed.

According to an embodiment, a vehicle control system includes an engine configured to auto-stop and auto-start; an electric parking brake configured to be selectively engaged and released; and a controller configured to auto-stop and auto-start the engine, and selectively engage and release the electric parking brake in response to application of an accelerator pedal.

In one or more embodiments, the controller may be configured to auto-stop the engine and engage the electric parking brake when a vehicle speed is less than a predefined threshold speed. The controller may also be configured to, in response to the engine being auto-stopped and the electric parking brake being applied, auto-start the engine without releasing the electric parking brake responsive to application of the accelerator pedal less than a predefined amount, and auto-start the engine and releasing the electric parking brake responsive to application of the accelerator pedal greater than the predefined amount. The controller may be configured to, in response to the vehicle being on a road grade greater than a predefined degree, auto-stop the engine and apply the electric parking brake, regardless of whether a brake pedal is pressed. The controller may be configured to, in response to the vehicle being on a road grade less than the predefined degree and whether the brake pedal is pressed, auto-stop the engine and selectively apply the electric parking brake. When the engine is auto-stopped and the brake pedal is not pressed, the controller may be configured to automatically apply the electric parking brake. When the engine is auto-stopped and the brake pedal is pressed, the controller may be configured to selectively apply the electric parking brake based on manual input. The controller may be further configured to engage, or keep engaged, the electric parking brake responsive to shifting the engine to park, neutral, or reverse, regardless of whether the engine is auto-stopped. When shifting the engine to reverse, the controller may be configured to engage the electric parking brake responsive to whether a brake pedal is depressed.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
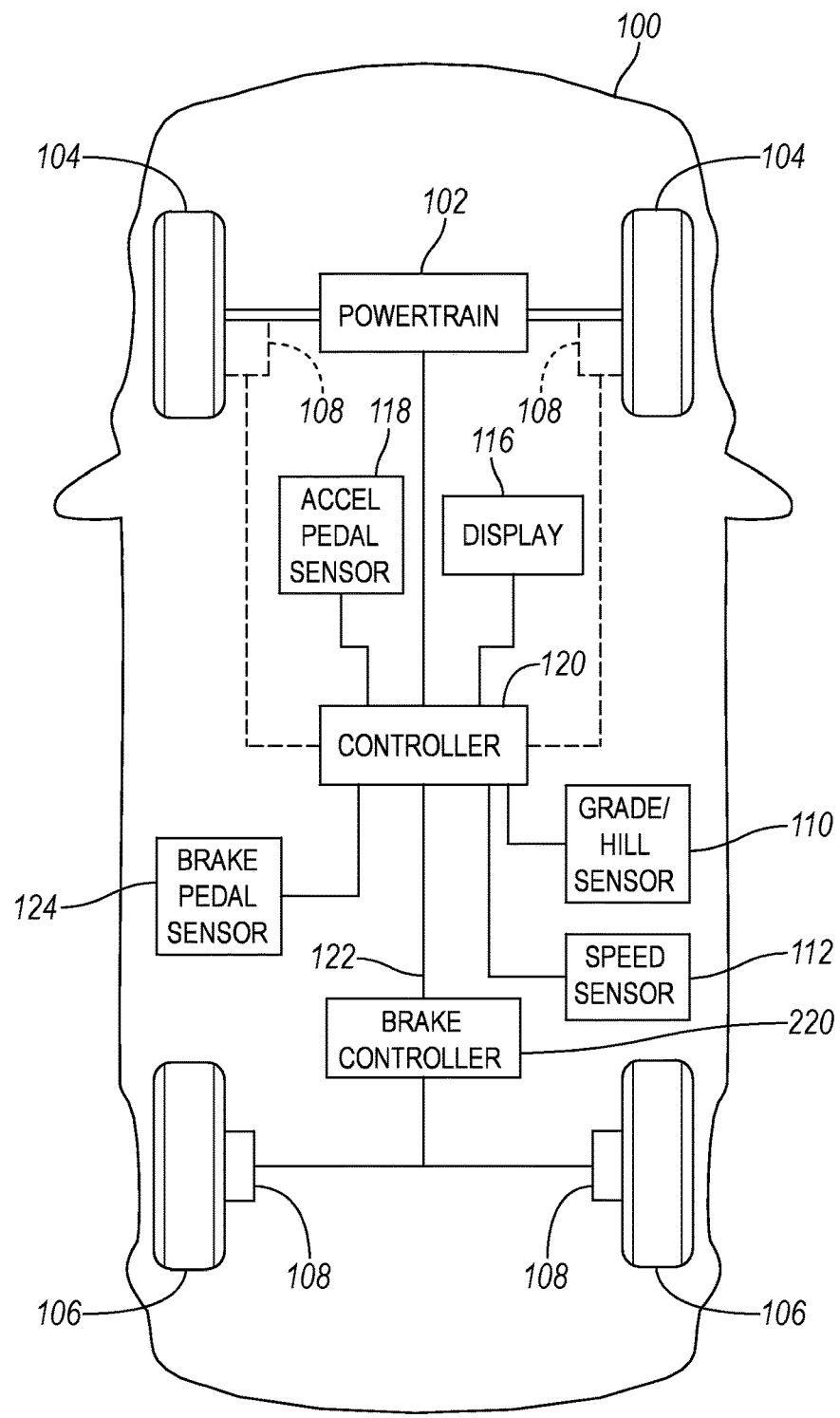
FIG. 1 is a block diagram of an exemplary vehicle.

FIG. 1 depicts a block diagram of vehicle 100. The vehicle 100 may include a powertrain 102 configured to provide propulsive torque to one or more wheels 104, 106. In some embodiments, wheels 104 may be drive wheels and wheels 106 may be drive wheels or non-driven wheels. The vehicle 100 may incorporate a variety of powertrain configurations. The powertrain 102 may include an internal combustion engine (ICE) or a diesel engine. The powertrain 102 may include one or more electric machines. In some powertrain configurations, the electric machine may be configured to rotate the engine for starting purposes. In some powertrain configurations, the electric machine may be configured to provide propulsive torque to the wheels 104 and/or 106. In a hybrid powertrain, the electric machine may be configured to provide propulsive torque and start the engine. The powertrain components include, but are not limited to, the engine, transmission, electric machines, power electronics modules, and traction battery. The powertrain components may each include a controller configured to control and monitor the associated component. The powertrain 102 may be configured as a front-wheel drive (FWD), rear-wheel drive (RWD, or all-wheel drive (AWD) system. The powertrain 102 may also include a starter/alternator (e.g., electric machine). The starter/alternator may be electrically coupled to a battery and configured to rotate a crankshaft of the engine for starting the engine and generating electrical power for the battery. In a conventional powertrain, the starter/alternator may be separate electric machines. The vehicle may include a powertrain 102 having an engine mechanically coupled to a transmission. The transmission may be a hybrid transmission with a power-split hybrid configuration including a planetary gear set and one or more electric machines connected to a traction battery.

The vehicle 100 may include at least one controller 120. The controller may include processor for executing instructions. The controller 120 may include volatile and non-volatile memory for storing data and programs. Although depicted as a single module, the controller 120 may include multiple controllers communicating via a vehicle network 122. For example, a brake controller 220 may be in communication with the controller 120 via the vehicle network 122. The vehicle network 122 may be a Controller Area Network (CAN). The vehicle network 122 may also include discrete signals transmitted via conductors between the controllers. The controller 120 may be part of a powertrain control system that manages and controls operation of the powertrain 102, including auto-start and auto-stop functions. The controller 120 receives signals from one or more sensors via vehicle network 122. The sensors include, but are not limited to, a brake pedal sensor 124, a speed sensor 112, a grade/hill sensor 110, and an accelerator pedal sensor 118. The controller 120 is also configured to send signals to a display 116.

The powertrain 102 may be configured to perform engine auto-stop and auto-start cycles. When certain auto-stop conditions are satisfied, the powertrain 102 may be programmed to auto-stop the engine. For example, an engine auto-stop may be triggered when a speed of the vehicle is below a threshold, as detected by speed sensor 112. When certain auto-start conditions are satisfied, the powertrain 102 may be programmed to auto-start the engine. For example, an engine auto-start may be triggered by releasing the brake pedal, as detected by brake pedal sensor 124.

The vehicle 100 may include one or more brake modules 108. The brake modules 108 may be configured to apply a torque to the wheels 104, 106 to resist rotation of the wheels. The brake modules 108 may be disc brakes, drum brakes, or some combination thereof. The brake modules may be controlled by the brake controller 220 via the vehicle network 122. Brake controller 220 may be an antilock braking system (ABS). The brake modules 108 may be configured with an electric parking brake (EPB) feature. In an electric parking brake configuration, the parking brake mechanism may be activated electrically using a motor. The EPB feature may include a mechanism that is configured to maintain a brake application at the wheels 104, 106. The EPB feature may be applied to a subset of all the wheels 104, 106. In some configurations, the EPB feature may be applied to all of the wheels 104, 106.

Figure 2:
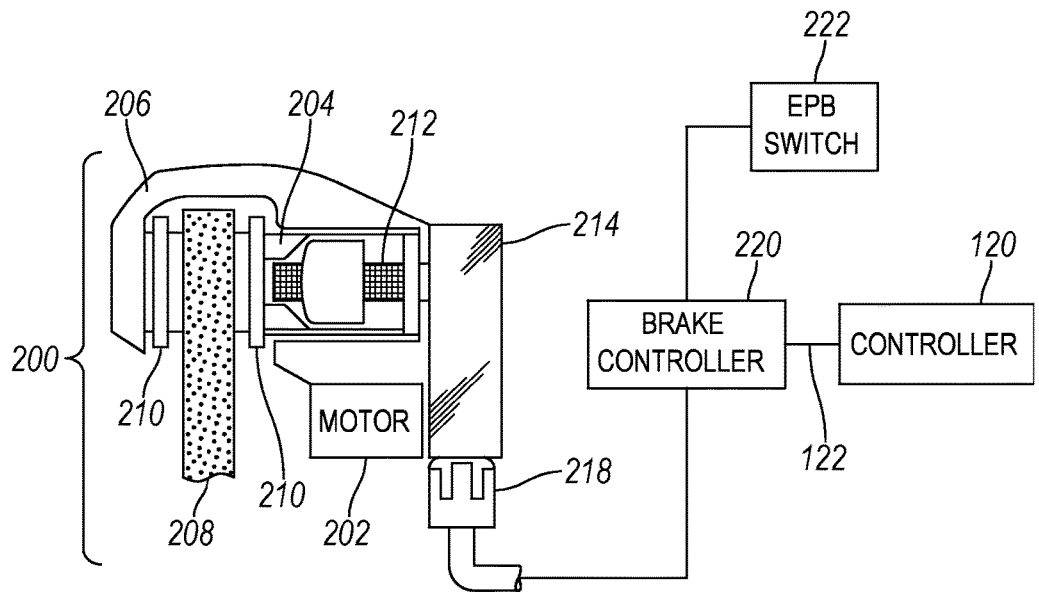
FIG. 2 is a diagram of an exemplary electric parking brake system.

FIG. 2 depicts a possible configuration of an electric parking brake (EPB) 200 of the brake module 108. The EPB 200 may include a motor 202 to actuate a piston 204 and a caliper 206 for disc brakes. A brake system may be a disc-brake system and include a brake rotor 208. Brake pads 210 may be coupled to the calipers 206 on each side of the brake rotor 208 so that the brake rotor 208 can freely move when the caliper 206 is not actuated. The brake piston 204 may be electrically actuated by an EPB motor 202. The EPB motor 202 may be linked to a drive screw 212 through a gear drive 214. The EPB motor 202 and/or gear drive 214 may be electrically linked to a brake controller 220 through an electrical connector 218. The brake controller 220 may be programmed to control a current distribution to the EPB motor 202. The EPB 200 may be incorporated in each brake module 108 of a selected vehicle axle, for example, non-driven wheels 106. Alternatively, all four wheels may include the EPB 200, or any combination of the wheels 104 and 106 can be fitted with the EPB 200.

The EPB 200 may include an EPB switch 222 configured to permit the driver to manually activate and deactivate the EPB system. The EPB switch 222 may be located in proximity to the driver to allow activation and deactivation of the EPB 200. The EPB switch 222 may be electrically coupled to brake controller 220. The brake controller 220 may include circuitry for receiving the EPB switch 222 signal, and may be programmed to determine the status of the EPB switch 222. The EPB switch 222 may be configured to have a plurality of positions. For example, in a first position, the EPB may be released to allow vehicle movement. In a second position, the EPB may be applied or engaged to prevent vehicle movement. In some configurations, the EPB switch 222 may be a push button. The brake controller 220 may be programmed to toggle the EPB position in response to activating the EPB switch 222, for example by pressing the push button.

The brake controller 220 may be programmed to actuate the EPB motor 202 in response to an activation of the EPB switch 222 by the driver or by the controller 120 over vehicle network 122 based on powertrain conditions as set by a driver or dealer. When an actuation signal is received via vehicle network 122, the brake controller 220 may instruct the EPB 200 to actuate and lock the wheels 104, 106.

Figure 3:
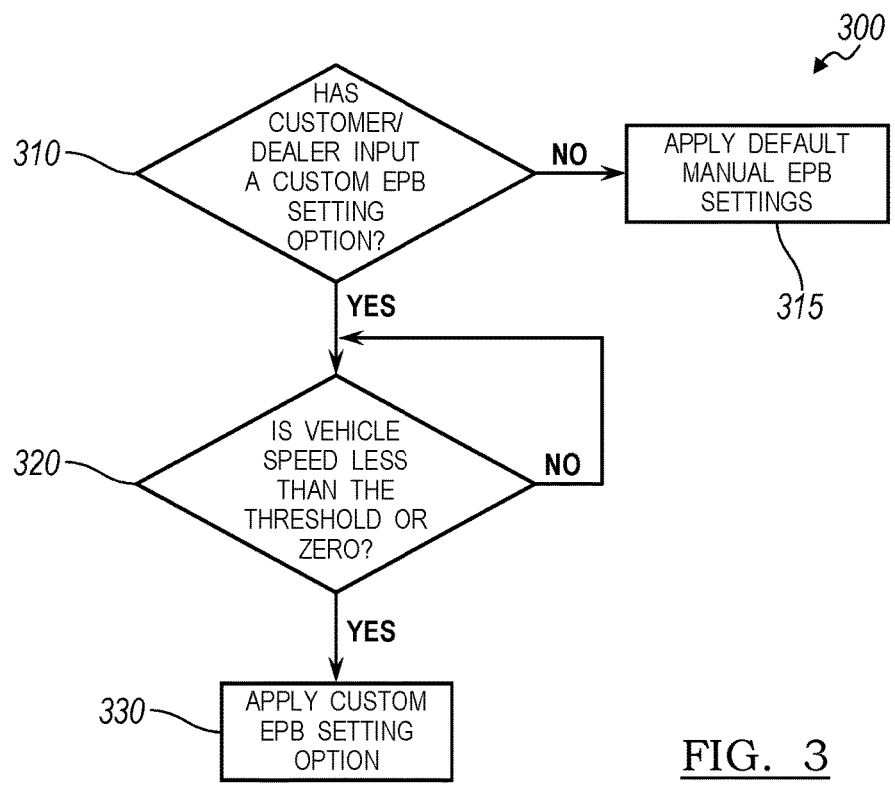
FIG. 3 is a flowchart for a sequence of operations for a vehicle with engine auto-stop/start system and an electric parking brake (EPB).
Figure 4:
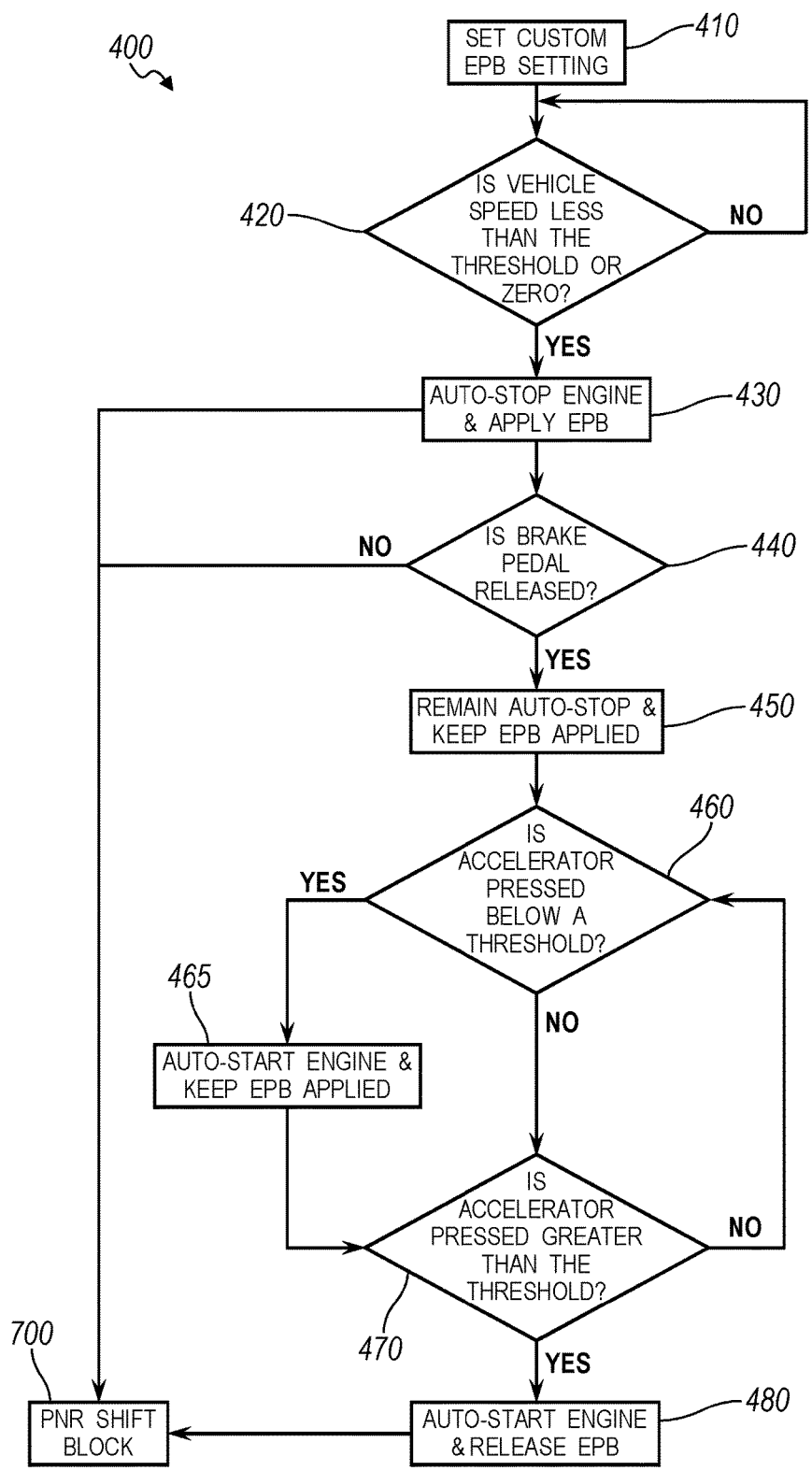
FIG. 4 is an exemplary flowchart for a sequence of operations for a vehicle based on a custom setting for the EPB.
Figure 5:
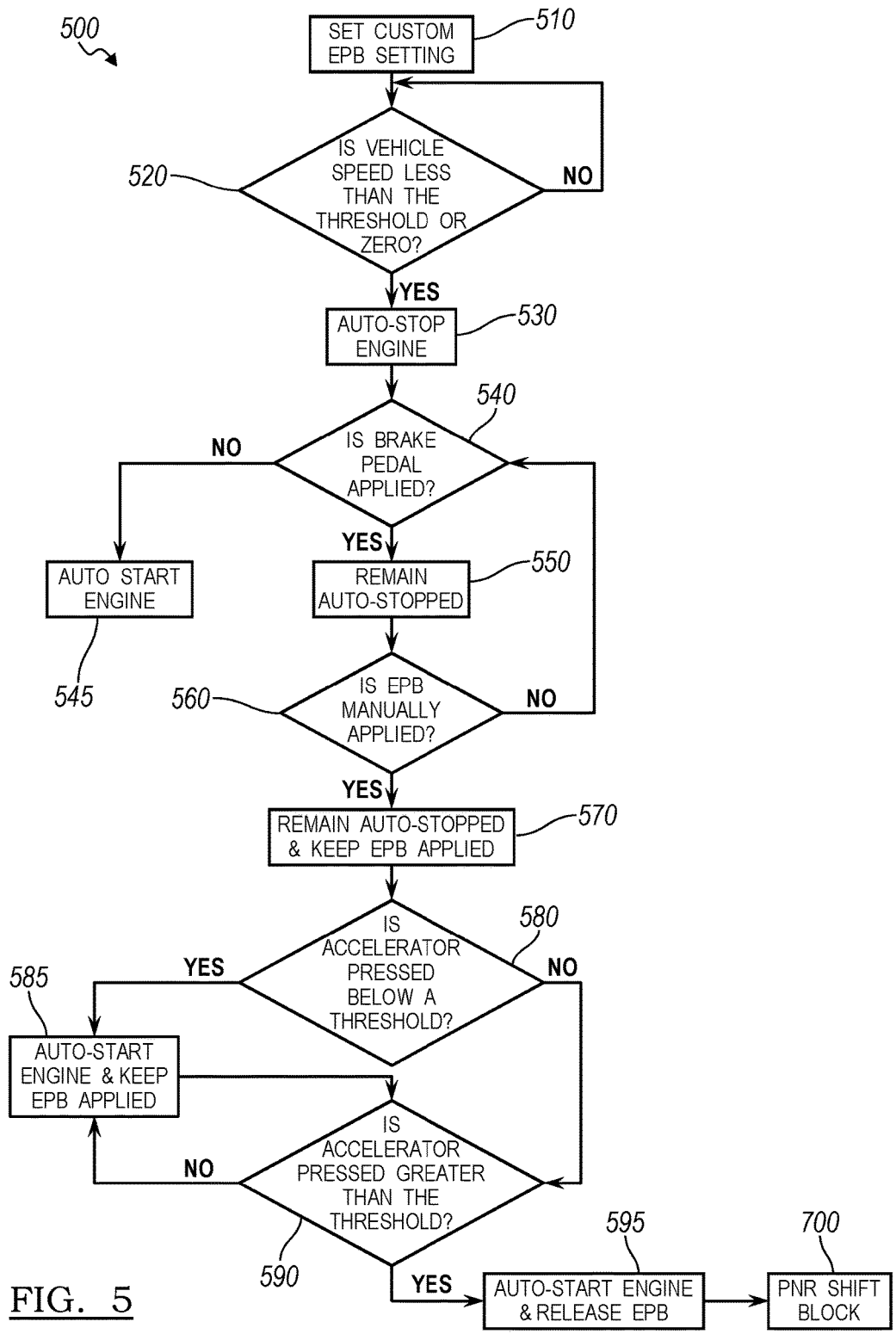
FIG. 5 is an exemplary flowchart for a sequence of operations for a vehicle based on a custom setting for the EPB.
Figure 6:
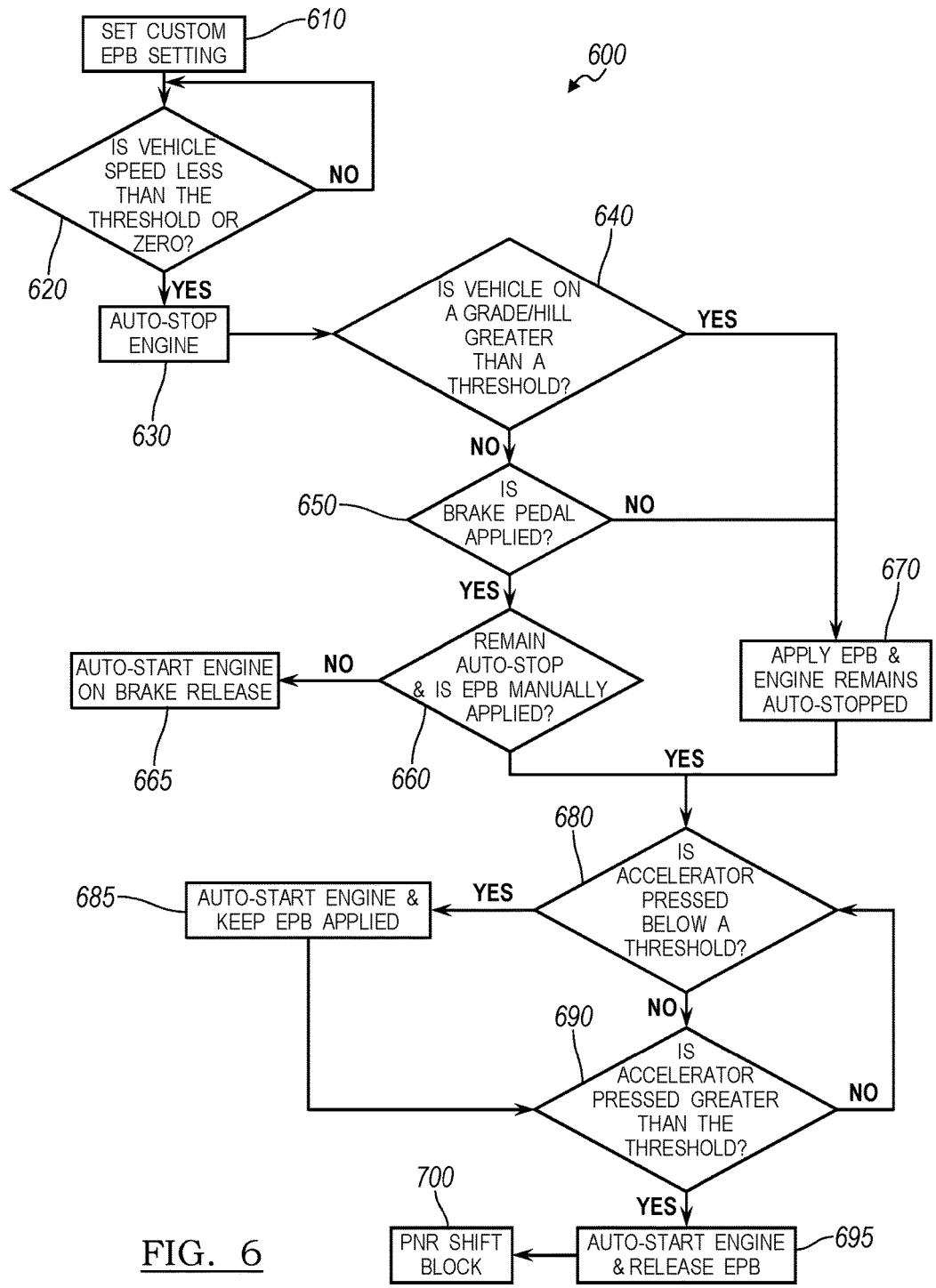
FIG. 6 is an exemplary flowchart for a sequence of operations for a vehicle based on a custom setting for the EPB.

FIG. 3 depicts a flowchart of a process for determining if a driver (customer) or dealer selected custom EPB option 300 has been selected and applying the custom EPB option 300. When drivers have a habit of utilizing the EPB 200, as in certain regions, the driver or dealer is not able to enable or disable the EPB settings based on driver preference to optimize engine auto-stop advantages. The controller 120 is configured to receive an input from a driver or dealer for a custom EPB setting option 300. The input may be from the display 116, which acts as an interface for the controller 120. The display 116 may include a diagnostic tool for cluster information display settings. At block 310, the controller 120 determines whether the driver or dealer has input custom EPB setting 300. If not, at block 315, the default manual EPB settings are applied (i.e., the EPB switch may be a push button which is manually applied by the vehicle, independent of engine auto-stop/start conditions). If a custom EPB setting has been input, at block 320, the speed sensor 112 detects the speed of the vehicle 100 such that the controller 120 can assess whether the vehicle speed is below a predefined threshold limit, or zero (i.e., the car is not moving). If not, the speed sensors 112 continue to check the speed of the vehicle 100. At block 330, if the vehicle speed is zero or below the threshold, the custom EPB setting is applied. The custom EPB setting allows for drivers with certain EPB habits to benefit from engine auto-stop/start advantages and provide automatic EPB application based on driving habits. FIGS. 4-6 provide flow charts of examples of custom EPB setting options for drivers or dealers to set.

FIG. 4 depicts a flow chart of a process for applying a driver (customer) or dealer selected custom EPB option 400. The EPB option 400 is shown as an automatic EPB option. At block 410, the controller 120 has set the custom EPB option 400 via driver or dealer input. At block 420, the speed sensor 112 detects the speed of the vehicle 100 such that the controller 120 can assess whether the vehicle speed is below a predefined threshold limit, or zero. If not, the speed sensors 112 continue to check the speed of the vehicle 100. At block 430, if the vehicle speed is zero or below the threshold, the controller 120 signals the powertrain 102 to auto-stop the engine and signals the brake controller 220 to apply, or engage, the EPB. The controller 120 may actuate the EPB switch 222 for signaling the brake controller 220. At block 440, brake pedal sensor 124 checks whether the brake pedal is released (i.e., the brake pedal is not depressed). If the brake pedal is not released (i.e., the brake pedal is depressed), the engine remains auto-stopped and the EPB remains applied when the transmission is in drive, and the controller 120 waits for a transmission shift (to park, neutral, or reverse) from the PNR shift block 700. If the brake pedal is released, at block 440, the engine remains auto-stopped and the EPB remains applied.

At block 460, the accelerator pedal sensor 118 checks whether and how much the accelerator pedal is depressed. If it is pressed below a predefined threshold (i.e., lightly pressed), at block 465 the engine is auto-started, and the EPB remains applied. If not, at block 470, the accelerator pedal sensor 118 checks if the accelerator pedal is pressed greater than the threshold amount. If yes, at block 480, the engine is auto-started and the EPB is released. When the engine is auto-started and EPB is released, the controller 120 can detect a transmission shift (to park, neutral, or reverse) to continue to the PNR shift block 700.

FIG. 5 depicts a flow chart for applying a driver or dealer selected custom EPB setting option 500, which is shown as a manual EPB option. At block 510, the controller 120 has set the custom EPB option 500 via driver or dealer input. At block 520, the speed sensor 112 detects the speed of vehicle 100 such that the controller 120 can assess whether the vehicle speed is below a predefined threshold limit, or zero. If not, the speed sensors 112 can continue to check the speed of the vehicle 100. At block 530, if the vehicle speed is zero or below the threshold, the controller 120 signals the powertrain 102 to auto-stop the engine. At block 540, the brake pedal sensor 124 checks whether the brake pedal is applied. If the brake pedal is not applied, the engine is auto-started at block 545. If the brake pedal is applied, at block 550, the engine remains auto-stopped. At block 560, the brake controller 220 checks whether the EPB has been manually applied. If the EPB is not applied, the brake pedal sensor 124 checks if the brake pedal is applied in block 540, and auto-starts the engine at block 545 if the brake pedal is not applied. If the EPB is manually applied, at block 570, the engine remains auto-stopped and the EPB remains applied.

At block 580, the accelerator pedal sensor 118 checks whether and how much the accelerator pedal is depressed. If it is pressed below a predefined threshold (e.g., pressed lightly), at block 585, the engine is auto-started and the EPB remains applied. If not, at block 590, the accelerator pedal sensor 118 checks if the accelerator pedal is pressed greater than the threshold amount. If yes, at block 595, the engine is auto-started and the EPB is released. When the engine is auto-started, the controller 120 can detect a transmission shift (to park, neutral, or reverse) to continue to the PNR shift block 700.

FIG. 6 depicts a flow chart for applying a driver or dealer selected custom EPB setting option 600, which is shown as a hybrid EPB option. At block 610, the controller 120 has set the custom EPB option 600 via driver or dealer input. At block 620, the speed sensor 112 detects the speed of vehicle 100 such that the controller 120 can assess whether the vehicle speed is below a predefined threshold limit, or zero. If not, the speed sensors 112 can continue to check the speed of the vehicle 100. At block 630, if the vehicle speed is zero or below the threshold, the controller 120 signals the powertrain 102 to auto-stop the engine. At block 640, grade/hill sensors 110 checks whether the vehicle 100 is on a grade or hill greater than a threshold amount. The grade or hill threshold may be a percentage. For example, the threshold may be a 7%, 8%, or 10% hill/road grade. If the vehicle 100 is on a grade greater than the threshold, at block 670, the EPB is automatically applied by brake controller 220 and the engine remains auto-stopped. If the vehicle is on a grade less than the threshold, at block 650, brake pedal sensor 124 checks whether the brake pedal is applied. If not, at block 670, the engine remains auto-stopped and the EPB is automatically applied by brake controller 220. If the brake pedal is applied, at block 660, the engine remains auto-stopped and the driver can manually apply the EPB. If the EPB is not applied at block 660, the engine auto-starts on brake release at block 665. If the EPB is applied, either manually (block 660) or automatically (block 670), the process continues to block 680.

At block 680, the accelerator pedal sensor 118 checks whether and how much the accelerator pedal is depressed. If it is pressed below a predefined threshold, at block 685, the engine is auto-started and the EPB remains applied. If not, at block 690, the accelerator pedal sensor 118 checks if the accelerator pedal is pressed greater than the threshold amount. If yes, at block 695, the engine is auto-started and the EPB is released. When the engine is auto-started, the controller 120 can detect a transmission shift (to park, neutral, or reverse) to continue to the PNR shift block 700.

Figure 7:
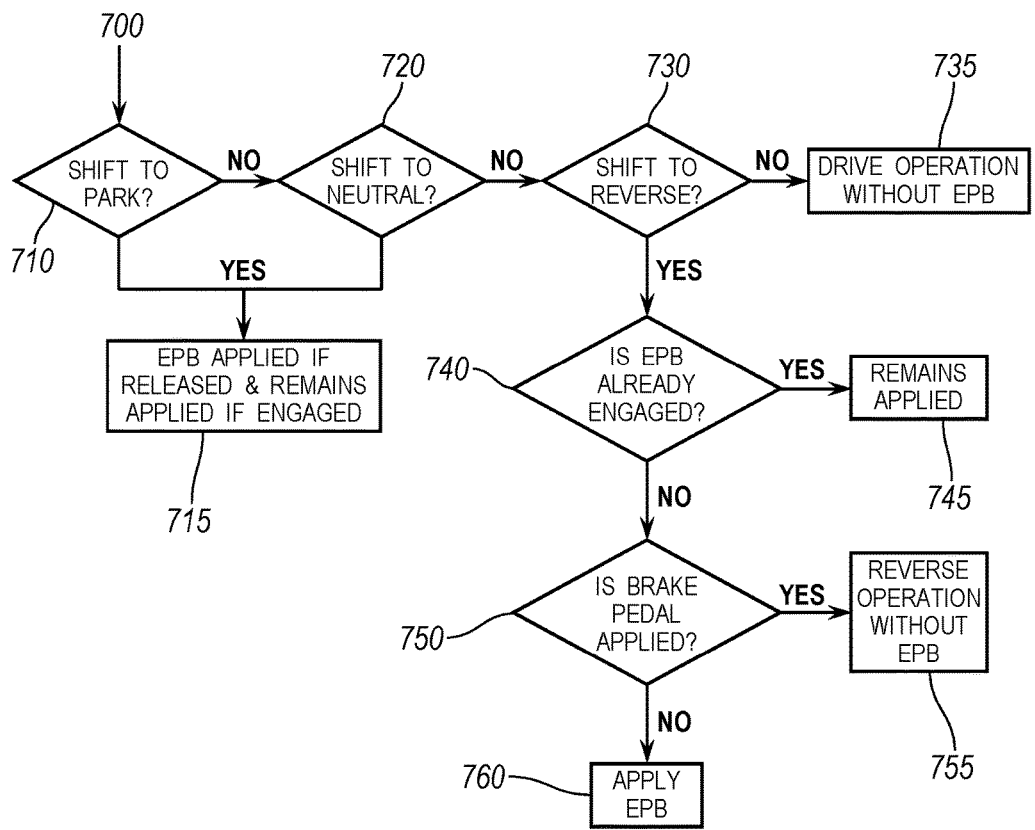
FIG. 7 is a flowchart for a sequence of operations for a vehicle with an EPB, based on shifting the transmission.

FIG. 7 depicts a flow chart for an example of a PNR shift block 700 for controlling the EPB and engine auto-stop/start features when there is a shift in the transmission of powertrain 102 to park, neutral, or reverse. At block 710, the powertrain signals the controller 120 and brake controller 220 whether the transmission has been shifted to park. If so, at block 715, the EPB is applied if it was not engaged, and remains applied if it was engaged. If the transmission has not shifted to park, at block 720, the powertrain signals the controller 120 and brake controller 220 whether the transmission has been shifted to neutral. If so, at block 715, the EPB is applied if it was not engaged, and remains applied if it was engaged. If the transmission has not shifted to neutral, at block 730, the powertrain signals the controller 120 and brake controller 220 whether the transmission has been shifted to reverse. If the transmission has not shifted to reverse, at block 735, the vehicle 100 is operated in drive without the EPB applied. If the transmission has shifted to reverse, at block 740, the brake controller checks whether the EPB is already engaged. If the EPB is already engaged, at block 745, it remains engaged. If the EPB is not already engaged, at block 750 the brake pedal sensor 124 checks whether the brake is applied. If the brake is applied, at block 755, the vehicle 100 is operated in reverse without the EPB applied. If the brake pedal is not applied, at block 760, the EPB is automatically applied by the brake controller 220.

With any of the customized EPB settings, the EPB is applied on shifting to park. In addition, the engine remains auto-stopped if it was stopped before. If the engine was running, the engine auto-stops in park after a timer expires. The timer is set to a predefined limit for auto-stopping the engine after shifting to park. Similarly, with any of the customized EPB settings, the EPB is applied upon shifting to neutral. Rolling (in neutral) is allowed since the customer can depress the brake or manually release the EPB in any gear. If propulsion is provided (i.e., the vehicle is in drive operation), the vehicle will auto-start before the EPB is released if the brake released. Upon shifting to neutral and the EPB is released manually or by brake depression, indication or notifications via display 116 may provide a warning to the driver that the vehicle 100 is subject to rolling. The notifications may be, but are not limited to, a pop up warning/message, a chime, or a voice notification. The engine may remain auto-stopped for the roll settings if the vehicle rolling speed is below a threshold and the EPB is released. However, the system will apply the EPB for any sense of rolling. If the customer/driver chooses to release the EPB to allow rolling, the engine will auto-start.

In regions where customers/drivers do not utilize the EPB, the customer or dealer may enable or disable the EPB usage for auto-stop purposes based on custom preference. Customized EPB setting options provide the customer/driver and dealers to configure the EPB upon engine auto-stopped for various driving conditions. The default setting, if a customized setting is not selected as in FIG. 3, is a manual EPB, independent of auto-start/stop functionality. In certain regions, drivers habitually engage the EPB upon stopping, and therefore release the brake pedal. In these circumstances, the benefits of engine auto-stop are diminished because the engine auto-starts on brake release. Also, providing a custom setting to automatically apply the EPB provides convenience to the drivers in these regions. Similarly, EPB usage on hills and high road grades reduces the benefits of engine auto-stop. Customized settings for the EPB engagement allow the driver to select the setting which matches the driving environment and habits of EPB usage to maximize the benefits of engine auto-stop/start functionality.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle control method comprising:
by a controller, while an engine is auto-stopped and an electric parking brake is engaged,
auto-starting the engine without releasing the electric parking brake responsive to application of an accelerator pedal less than a predefined amount, and
auto-starting the engine and releasing the electric parking brake responsive to application of the accelerator pedal greater than the predefined amount.

2. The vehicle control method of claim 1, further comprising auto-stopping the engine and engaging the electric parking brake responsive to vehicle speed being less than a predefined threshold speed.

3. The vehicle control method of claim 1, further comprising:
by the controller, regardless of whether the engine is auto-stopped and whether the electric parking brake is engaged,
engaging, or keeping engaged, the electric parking brake responsive to shifting the engine to park, neutral, or reverse.

4. The vehicle control method of claim 3, wherein engaging or keeping engaged the electric parking brake responsive to shifting the engine to reverse further includes engaging the electric parking brake responsive to whether a brake pedal is depressed.

5. The vehicle control method of claim 1, further comprising:
by the controller, while the engine is auto-stopped and the electric parking brake is not engaged, selectively engaging the electric parking brake responsive to a manual electric parking brake input engaging the electric parking brake while a brake pedal is applied.

6. The vehicle control method of claim 5, further comprising:
by the controller, while the engine is auto-stopped and the electric parking brake is not engaged, auto-starting the engine responsive to the brake pedal not being applied.

7. A vehicle control method comprising:
by a controller, while a vehicle is on a road grade greater than a predefined degree, automatically applying an electric parking brake responsive to auto-stopping an engine regardless of whether a brake pedal is pressed; and while the vehicle is on a road grade less than the predefined degree, selectively applying the electric parking brake responsive to auto-stopping the engine based on whether the brake pedal is pressed; and by the controller, while the engine is auto-stopped and the electric parking brake is engaged, auto-starting the engine without releasing the electric parking brake responsive to application of an accelerator pedal less than a predefined amount, and auto-starting the engine and releasing the electric parking brake responsive to application of the accelerator pedal greater than the predefined amount.

8. The vehicle control method of claim 7, further comprising auto-stopping the engine responsive to vehicle speed being less than a predefined threshold speed.

9. The vehicle control method of claim 7, further comprising:

by the controller, regardless of whether the engine is auto-stopped and whether the electric parking brake is engaged, engaging, or keeping engaged, the electric parking brake responsive to shifting the engine to park, neutral, or reverse.

10. The vehicle control method of claim 9, wherein engaging or keeping engaged the electric parking brake responsive to shifting the engine to reverse further includes engaging the electric parking brake responsive to whether the brake pedal is depressed.

11. A vehicle control system comprising:

an engine configured to auto-stop and auto-start;

an electric parking brake configured to be selectively engaged and released; and a controller configured to auto-stop and auto-start the engine, and selectively engage and release the electric parking brake in response to application of an accelerator pedal, wherein the controller is further configured to, in response to the vehicle being on a road grade greater than a predefined degree, auto-stop the engine and apply the electric parking brake, regardless of whether a brake pedal is pressed, and in response to the vehicle being on a road grade less than a predefined degree and whether a brake pedal is pressed, auto-stop the engine and selectively apply the electric parking brake based on a manual electric parking brake input engaging the electric parking brake.

12. The system of claim 11, wherein the controller is configured to auto-stop the engine and engage the electric parking brake when a vehicle speed is less than a predefined threshold speed.

13. The system of claim 12, wherein the controller is further configured to, in response to the engine being auto-stopped and the electric parking brake being applied, auto-start the engine without releasing the electric parking brake responsive to application of the accelerator pedal less than a predefined amount, and auto-start the engine and releasing the electric parking brake responsive to application of the accelerator pedal greater than the predefined amount.

14. The system of claim 11, wherein when the engine is auto-stopped and the brake pedal is not pressed, the controller is configured to automatically apply the electric parking brake.

15. The system of claim 11, wherein the controller is further configured to engage, or keep engaged, the electric parking brake responsive to shifting the engine to park, neutral, or reverse, regardless of whether the engine is auto-stopped.

16. The system of claim 15, wherein, when shifting the engine to reverse, the controller is configured to engage the electric parking brake responsive to whether a brake pedal is depressed.

* * * * *